United States Patent
West et al.

(10) Patent No.: US 7,303,372 B2
(45) Date of Patent: Dec. 4, 2007

(54) METHODS AND APPARATUS FOR COOLING COMBUSTION TURBINE ENGINE COMPONENTS

(75) Inventors: James Anthony West, Simpsonville, SC (US); William Stephen Kvasnak, Simpsonville, SC (US); Brendan Francis Sexton, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 204 days.

(21) Appl. No.: 11/282,348

(22) Filed: Nov. 18, 2005

(65) Prior Publication Data

US 2007/0116562 A1    May 24, 2007

(51) Int. Cl.
*F03B 11/02*    (2006.01)
(52) U.S. Cl. ............... 415/208.1; 415/115; 415/176
(58) Field of Classification Search ............ 415/115, 415/175, 176, 177, 208.1
See application file for complete search history.

(56) References Cited

U.S. PATENT DOCUMENTS

| | | | |
|---|---|---|---|
| 2,847,185 A * | 8/1958 | Retrie et al. ............... 415/115 |
| 3,703,808 A * | 11/1972 | Steams ...................... 415/115 |
| 4,126,405 A * | 11/1978 | Bobo et al. ................. 415/115 |
| 4,314,793 A * | 2/1982 | DeTolla et al. ............ 415/135 |
| 4,492,517 A | 1/1985 | Klompas |
| 4,657,482 A * | 4/1987 | Neal ........................... 415/176 |
| 4,889,469 A * | 12/1989 | Wilkinson ................. 415/191 |
| 5,154,577 A * | 10/1992 | Kellock et al. .......... 415/170.1 |
| 5,252,026 A * | 10/1993 | Shepherd .................... 415/115 |
| 5,288,207 A | 2/1994 | Linask |
| 5,591,002 A | 1/1997 | Cunha et al. |
| 5,738,493 A | 4/1998 | Lee et al. |
| 5,813,835 A | 9/1998 | Corsmeier et al. |
| 6,142,730 A | 11/2000 | Tomita et al. |
| 6,183,194 B1 | 2/2001 | Cunha et al. |
| 6,261,054 B1 | 7/2001 | Bunker et al. |
| 6,435,813 B1 | 8/2002 | Rieck, Jr. et al. |
| 6,435,814 B1 | 8/2002 | Yu et al. |
| 6,468,031 B1 | 10/2002 | Yu et al. |
| 6,506,013 B1 | 1/2003 | Burdgick et al. |
| 6,868,676 B1 | 3/2005 | Haynes |
| 7,037,071 B2 * | 5/2006 | Antunes et al. ............. 415/189 |

* cited by examiner

*Primary Examiner*—Igor Kershteyn
(74) *Attorney, Agent, or Firm*—Armstrong Teasdale LLP

(57) ABSTRACT

A turbine nozzle cooling sub-system is provided. The sub-system includes at least one turbine nozzle segment. The segment includes an arcuate, radially outermost endwall, an arcuate, radially innermost endwall, and at least one airfoil vane. The endwalls each include at least one open passage. The airfoil vane extends between and is coupled to the endwalls. The vane further includes a cavity, a leading edge, a trailing edge, and an airfoil vane external surface. The cavity includes an airfoil vane internal surface and a plurality of turbulators. The cavity and the open passages are in flow communication such that an airfoil cooling air stream flow is facilitated. The sub-system also includes at least one diffuser in flow communication with a compressor assembly and the segment. The diffuser includes at least one diffuser wall and cavity. The diffuser wall extends from the compressor assembly to the segment such that a channeling of the airfoil cooling air stream to the segment is facilitated. The airfoil cooling air stream includes at least a portion of a compressor assembly discharge air stream flow.

20 Claims, 6 Drawing Sheets

METHODS AND APPARATUS FOR COOLING COMBUSTION TURBINE ENGINE COMPONENTS

BACKGROUND OF THE INVENTION

This invention relates generally to rotary machines and, more particularly, to methods and apparatus for cooling combustion turbine engine components.

Many known combustion turbine engines ignite a fuel-air mixture in a combustor assembly and generate a combustion gas stream that is channeled to a turbine assembly via a hot gas path. Compressed air is channeled to the combustor assembly by a compressor assembly. The output of the turbine assembly may be used to power a machine, for example, an electric generator or a pump.

Airfoils are employed in many known combustion turbine engines, for example, as stationary vanes and rotating blades. Rotating blades are often referred to as buckets. Vanes are typically positioned immediately upstream of associated buckets and may be configured as nozzles. A vane-bucket combination is often referred to as a stage. The buckets are normally coupled to a turbine rotor and the vanes are normally coupled to a stationary portion of the turbine assembly that includes the turbine casing. The combustion gas stream is channeled to predetermined vectors via the vanes such that impingement of the gas stream on the buckets is facilitated. The stages of the turbine assembly facilitate conversion of the thermal energy contained in the combustion gas stream into mechanical energy in the form of engine rotor rotation.

In many known combustion turbine engines, engine efficiency normally increases as combustion gas stream temperature increases. One typical range of combustion gas stream temperatures is approximately 1316° Celsius (C.) to 1427° C. (2400° Fahrenheit (F.) to 2600° F.). In some of these engines, an upper parameter of combustion gas temperature may exist due to the temperature limitations of the materials used to form the affected components. Extended exposure to temperatures exceeding known limitations may induce component deformation or other component life-reducing effects.

Some known methods of attaining desired combustion gas stream temperatures while mitigating the potentially deleterious effects as described above is to introduce a method of cooling the affected components during engine operation. One of these known methods is channeling a portion of an air stream flow from a compressor assembly discharge to the affected components.

In some of the aforementioned known engines, one of the components that may be cooled as described above is the first stage turbine nozzle, sometimes referred to as the S1N (stage one nozzle). The S1N, that includes at least one vane, normally channels the combustion gas stream flow within the hot gas path from the combustor assembly to the set of buckets associated with the first stage of the turbine assembly.

Many known combustion turbine engines channel cooling air to a cavity within the S1N vanes and the air is subsequently channeled to the combustion gas stream via openings in the turbine nozzle vanes, a process often referred to as film cooling. The cooling air stream is typically at a higher pressure than the combustion gas stream, therefore, flow of air into the gas stream is facilitated. Cooler air entering the gas stream via the nozzle vane cavities is disposed to the radially outwardmost section of the nozzle, i.e., the outer surface of the vane, and induces a film cooling effect by forming a layer of cooler air along the outer walls of the vanes, thereby mitigating the effects of the high temperature combustion gas stream on the vanes.

Some known combustion turbine engines that use this form of film cooling of turbine nozzle vanes may induce a reduction of the temperature of the combustion gas stream within the hot gas path prior to combustion gas stream introduction to the first stage buckets of the turbine assembly. The reduction in temperature is due to the cooling air mixing with the higher temperature gas. Some known combustion turbines may experience a gas stream temperature reduction in the range of 80° C. to 150° C. (176° F. to 302° F.). This condition has a tendency to decrease the power output of the turbine assembly for a given rate of combustion, thereby resulting in a decrease in engine efficiency.

One method often used to overcome the decrease in temperature is to increase the firing rate, i.e., the rate of fuel combustion and facilitate an increase in the combustion gas stream prior to the turbine nozzle to restore the temperature of the combustion gas stream at the first stage bucket subsequent to an introduction of cooling air into the gas stream. While the results of this action tends to restore combustion gas stream temperature and the turbine assembly power output, it also increases the rate of combustion.

Increasing the rate of combustion with the subsequent increase in combustion gas temperature above a predetermined threshold value, generally accepted to be approximately 1538° C. (2800° F.), may tend to induce increased formation of nitrogen oxides, often referred to as $NO_x$, i.e., components of combustion gas streams that have a variety of associated environmental issues, including regulatory limitations. To facilitate mitigating a potential for $NO_x$ formation, one parameter often observed by engine operators to monitor combustion is a fuel/air ratio, i.e., the ratio of fuel combusted to air used for that combustion. As the ratio decreases, the potential for $NO_x$ formation decreases. Generally, combustion turbines operate with lean combustion, i.e., the ratio is as low as practical, with actual ratios in the range of 0.025-0.032. Diverting some of the air discharged from the compressor to the nozzle cooling circuit from the combustion process tends to decrease the air value in the ratio, and the fuel/air ratio tends to increase. As discussed above, these circumstances tend to increase the potential for $NO_x$ formation. Hence, it is desirable to minimize the amount of air (discharged from the compressor) that is used for cooling of the nozzles and subsequently discharged into the gas stream. Reducing the predetermined amount of cooling air reduces the performance effects associated with the discharge of the cooling air into the gas stream and lowers the fuel/air ratio, thereby reducing the potential for $NO_x$ formation.

The combination of an upper threshold of gas temperatures (due to material limitations and $NO_x$ formation) and the narrow range of fuel/air ratios (due to $NO_x$ formation) may reduce flexibility in establishing a most efficient mode of operation of a combustion turbine engine.

BRIEF DESCRIPTION OF THE INVENTION

In one aspect, a turbine nozzle cooling sub-system is provided. The sub-system includes at least one turbine nozzle segment. The segment includes an arcuate, radially outermost endwall, an arcuate, radially innermost endwall, and at least one airfoil vane. The outermost endwall includes at least one open passage. The innermost endwall includes at least one open passage. The at least one airfoil vane extends between and is coupled to the inner radial endwall and the outer radial endwall. The vane further includes a cavity, a leading edge, a trailing edge, and an airfoil vane external surface. The cavity includes an airfoil vane internal surface and a plurality of turbulators. The cavity and the open passages are in flow communication such that an airfoil cooling air stream flow is facilitated. The sub-system also includes at least one diffuser in flow communication with a compressor assembly and the at least one turbine nozzle segment. The diffuser includes at least one diffuser wall and at least one cavity. The at least one diffuser wall extends from the compressor assembly to the turbine nozzle segment such that a channeling of the airfoil cooling air stream to the at least one turbine nozzle segment is facilitated. The airfoil cooling air stream includes at least a portion of a compressor assembly discharge air stream flow.

In another aspect, a method of assembling a combustion turbine engine is provided. The method includes coupling the at least one turbine nozzle segment to at least a portion of a combustion turbine engine stationary support structure. The method also includes coupling the at least one turbine nozzle segment to at least one transition piece. The method further includes coupling a cooling fluid source to the at least one turbine nozzle segment such that a cooling fluid may be channeled to at least one turbine nozzle airfoil vane. The method also includes coupling a diffuser wall to a compressor assembly and the at least one turbine nozzle segment, so that at least a portion of a compressor assembly discharge air stream flows to the at least one turbine nozzle segment.

In a further aspect, a combustion turbine engine is provided. The engine includes a compressor assembly and a combustor assembly in flow communication with the compressor assembly. The engine also includes a turbine nozzle cooling sub-system. The sub-system includes at least one turbine nozzle segment. The nozzle includes an arcuate, radially outermost endwall, an arcuate, radially innermost endwall, and at least one airfoil vane. The outermost endwall includes at least one open passage. The innermost endwall includes at least one open passage. The at least one airfoil vane extends between and is coupled to the inner radial wall and the outer radial wall. The vane further includes a cavity, a leading edge, a trailing edge, and an airfoil vane external surface. The cavity includes an airfoil vane internal surface and a plurality of turbulators. The cavity and the open passages are in flow communication such that an airfoil cooling air stream flow is facilitated. The at least one diffuser is in flow communication with a compressor assembly and the at least one turbine nozzle segment. The diffuser includes at least one diffuser wall and at least one cavity. The at least one diffuser wall extends from the compressor assembly to the turbine nozzle segment such that a channeling of the airfoil cooling air stream to the at least one turbine nozzle segment is facilitated. The airfoil cooling air stream includes at least a portion of a compressor assembly discharge air stream flow. The engine also includes a turbine assembly in flow communication with the turbine nozzle cooling sub-system.

DETAILED DESCRIPTION OF THE INVENTION

Figure 1:
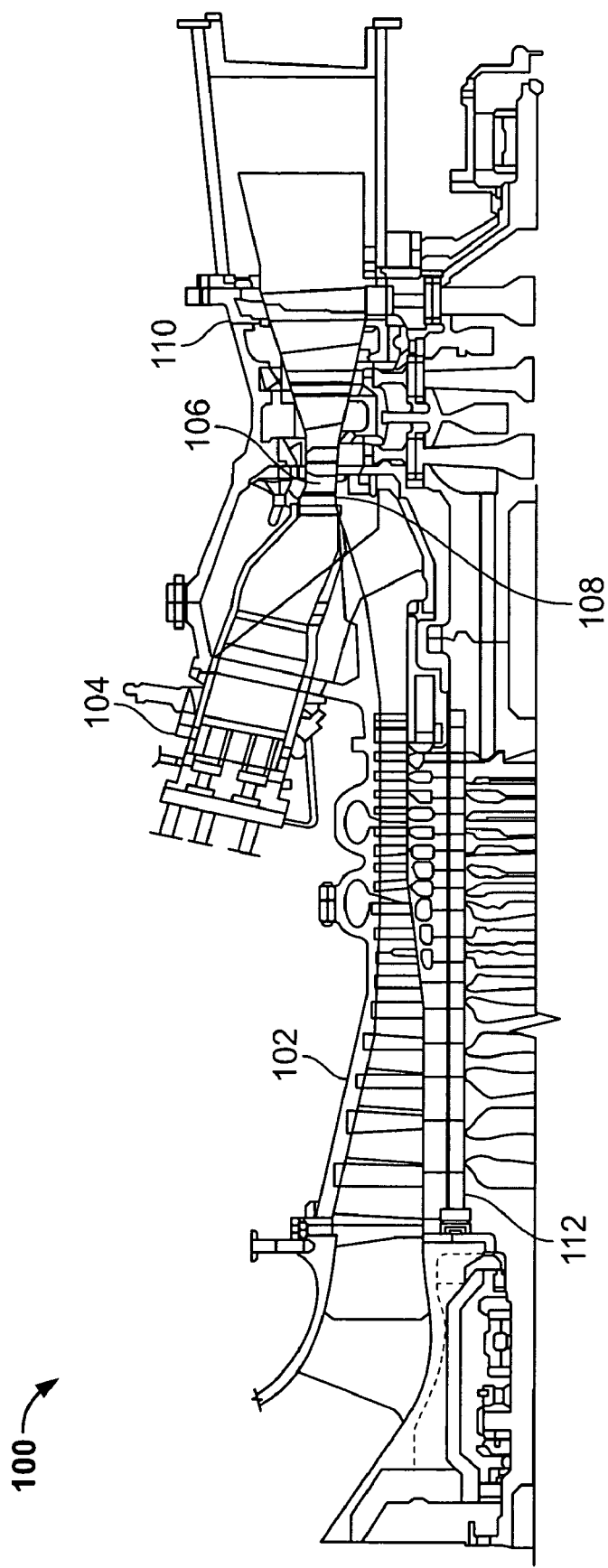
FIG. 1 is a schematic illustration of an exemplary combustion turbine engine.

FIG. 1 is a schematic illustration of an exemplary combustion turbine engine 100. Engine 100 includes a compressor assembly 102, a combustor assembly 104, a first stage turbine nozzle 106, a turbine nozzle cooling sub-system 108, a turbine assembly 110 and a common compressor/turbine shaft 112 (sometimes referred to as rotor 112). In one embodiment, engine 100 is a MS7001FB engine, sometimes referred to as a 7FB engine, commercially available from General Electric Company, Greenville, S.C.

In operation, air flows through compressor assembly 102 and compressed air is supplied to combustor assembly 104, assembly 104 being in flow communication with assembly 102. Combustor assembly 104 ignites and combusts fuel, for example, natural gas and/or fuel oil, using air from assembly 102 and generates a high temperature combustion gas stream of approximately 1316° Celsius (C.) to 1427° C. (2400° Fahrenheit (F.) to 2600° F.). Combustor assembly 104 is also in flow communication with first stage turbine nozzle 106, sometimes referred to as the S1N, and the high temperature gas stream is directed to nozzle 106. Nozzle 106 includes at least one vane (not shown in FIG. 1) that facilitates a change in direction of the gas stream such that gas flow to a first stage bucket (not shown in FIG. 1) of turbine assembly 110 such that energy conversion from gas stream thermal energy to rotor 112 rotational energy by turbine assembly 110 is facilitated. First stage turbine nozzle cooling sub-system 108 facilitates cooling of nozzle 106 as is described in more detail below. Turbine assembly 110 is rotatably coupled to and drives rotor 112 that subsequently provides rotational power to compressor assembly 102, assembly 102 also rotatably coupled to shaft 112. In the exemplary embodiment, there is a plurality of combustor assemblies 104 and nozzles 106. In the following discussion, unless otherwise indicated, only one of each component will be discussed.

Figure 2:
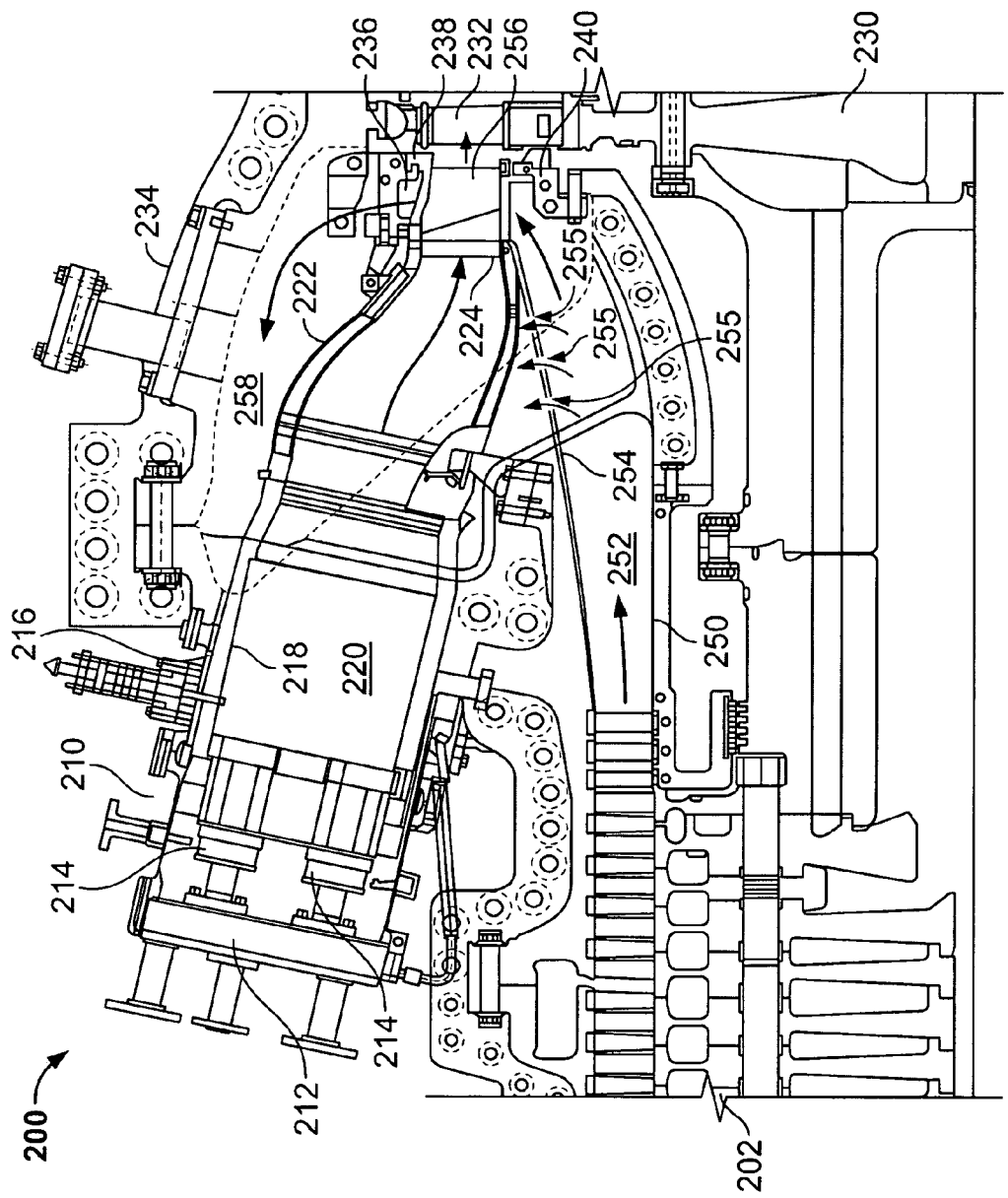
FIG. 2 is a fragmentary schematic illustration of an exemplary embodiment of a turbine nozzle cooling sub-system that may be used with the combustion turbine engine in FIG. 1.
Figure 3:
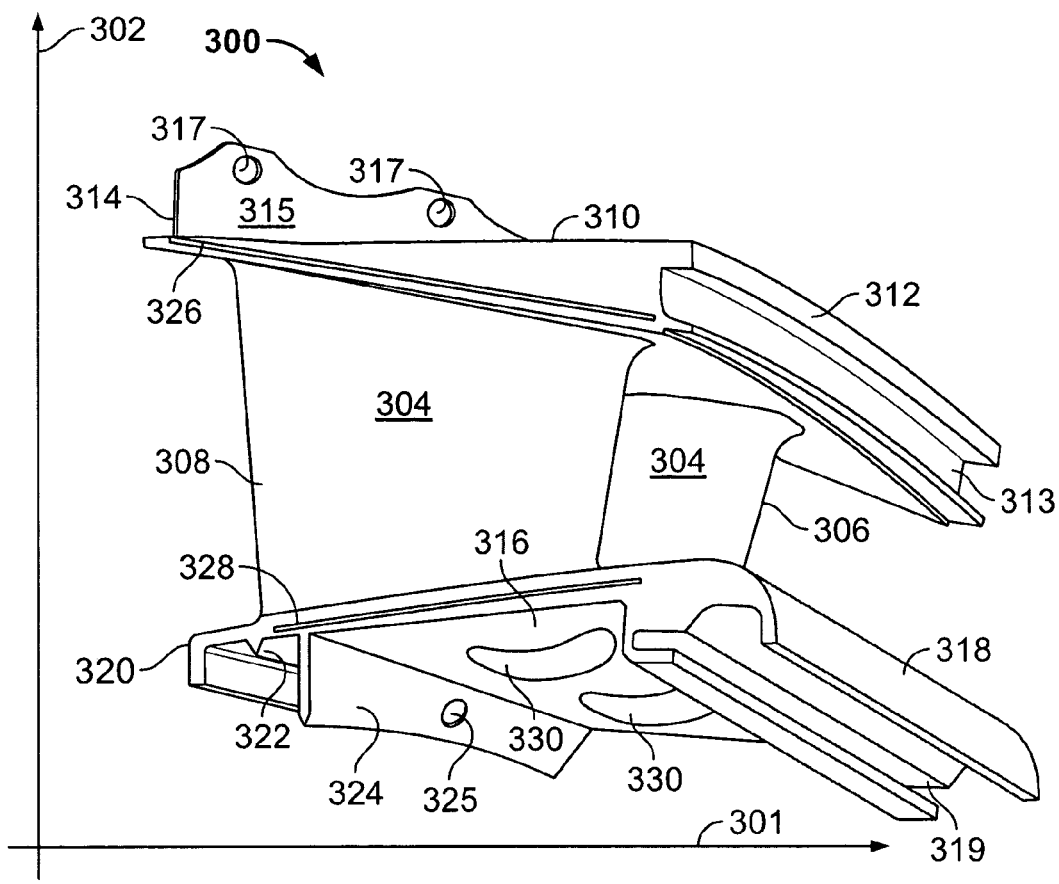
FIG. 3 is an illustration of an exemplary embodiment of a first stage turbine nozzle segment that may be used with the combustion turbine engine in FIG. 1.

FIG. 2 is a fragmentary schematic illustration of an exemplary embodiment of a turbine nozzle cooling sub-system 200 that may be used with combustion turbine engine 100 (shown in FIG. 1). Sub-system 200 is associated with and in flow communication with compressor assembly 202. Sub-system 200 is also associated with and in flow communication with combustor assembly 210. Assembly 210 includes a combustor end cover 212, a plurality of fuel nozzles 214, a combustor casing 216, a combustor liner 218, a combustor chamber 220, a transition piece 222, and a combustor exit 224. Furthermore, sub-system 200 is associated with and in flow communication with turbine assembly 230. Assembly 230 includes a first stage bucket 232, an outer shell 234, and inner shell 236, an outer support structure 238 and an inner support structure 240. Sub-system 200 includes a diffuser 250, wherein diffuser 250 includes a diffuser cavity 252 and a diffuser wall 254. Diffuser wall 254 includes a plurality of open passages 255, sometimes referred to as bypass holes. Sub-system 200 also includes a turbine nozzle 256, and a compressor discharge plenum 258. Turbine nozzle 256 includes a plurality of turbine nozzle segments, one of which is illustrated in FIG. 3.

In operation, compressor assembly 202 is driven by turbine assembly 230 via common shaft 112 (shown in FIG. 1) as discussed above. As compressor assembly 202 rotates, it compresses air and discharges compressed air into diffuser 250 as the associated arrow illustrates. The air enters diffuser cavity 252 and a portion is channeled to turbine nozzle 256 via diffuser wall 254 as illustrated by the associated arrow, and may be referred to as an airfoil or, a nozzle cooling air stream. A further portion of compressor assembly 202 discharged air is channeled directly to compressor discharge plenum 258 via a plurality of open passages 255 as the associated arrows illustrate and as discussed further below. The portion of air directed to nozzle 256 is channeled out of nozzle 256 to plenum 258 as the associated arrow illustrates.

Open passages 255 (bypass holes) may be dimensioned and positioned in diffuser wall 254 to set a predetermined percentage of airflow that bypasses nozzle 256. In the exemplary embodiment, approximately 50% of compressor 202 air discharge stream is channeled to the nozzle cooling air stream, approximately 40% channeled directly to compressor discharge plenum 258, with only a minimal amount of air channeled to airfoil trailing edge and platform cooling. Nozzle 256 convective cooling is facilitated by increasing the mass flow rate of the nozzle cooling air stream. In an alternate embodiment, the percentage of compressor 202 discharge channeled to turbine nozzle cooling sub-system 200 may be increased to substantially 100%.

Combustor assembly 210 receives air from plenum 258 via combustor end cover 212. Fuel is received by combustor assembly 210 via fuel nozzles 214. Fuel and air are injected into combustion chamber 220 that is formed via combustor liner 218. Liner 218 is supported via combustor casing 216, casing 216 also facilitating isolation of combustion chamber 220 combustion processes from the outside environment, for example, a turbine compartment. Fuel is ignited and combusted within chamber 220 and resultant combustion gases are channeled toward and through transition piece 222. Transition piece 222 channels the combustion gas stream to combustor exit 224 and, subsequently, to a segment of turbine nozzle 256 (described further below) as illustrated by the associated arrow. The combustion gas stream is further directed by nozzle 256 to bucket 232 as illustrated by the associated arrow. The combustion gas stream path that includes chamber 220 to transition piece 222, to combustor exit 224, then to nozzle 256 and, subsequently, to first stage 232, may be referred to as the hot gas path.

Generally, the pressure drop, sometimes referred to as differential pressure, from the compressor 202 discharge to the inlet of turbine assembly 230, i.e., first stage bucket 232, associated with the torturous trek through the air path to combustor assembly 210, through the combustion process, and subsequently into the hot gas path is a parameter observed by operators to evaluate turbine efficiency. It is noted that using compressor 202 discharge air to cool nozzle 222 before the air enters combustor 210 may tend to increase the pressure drop between compressor 202 discharge and first stage bucket 232, which may subsequently decrease engine 100 (shown in FIG. 1) efficiency. In the exemplary embodiment, the cooling circuit may be dimensioned and positioned as described above to mitigate an increase of the overall pressure drop to approximately less than 2%. Mitigating the differential pressure increase as well as increasing air flow velocity, by approximately 0.15 mach number (MN), in conjunction with the increase in mass flow rate as described above, in the nozzle cooling air flow stream facilitates a condition wherein film cooling of nozzle 256, as described above, may be substantially to a large extent, and in some circumstances, not totally replaced with convection cooling. Additionally, the potential decrease in engine 100 efficiency due to the aforementioned differential pressure increase may be offset by the approximately 93° C. (200° F.) temperature increase that may be realized by not injecting cooling air into the combustion gas stream via nozzle 256 film cooling. Additionally, mixing the discharged air from nozzle 256 with a first temperature into compressor discharge plenum 258 that receives air from diffuser 250 at a second temperature, with the first temperature being greater than the second temperature, may facilitate an overall increase in the temperature of air flow to combustor assembly 210, thereby facilitating a subsequent improvement in combustor assembly 210 operability.

Outer shell 234 facilitates channeling air within plenum 258 and facilitates isolation of turbine assembly 230 from the outside environment, for example, a turbine compartment. Inner shell 236 facilitates gas flow through the turbine stages including the first stage, i.e., nozzle 256 and bucket 232, as well as the subsequent stages (not shown in FIG. 2). Nozzle 256 includes a plurality of nozzle segments (not shown in FIG. 1 and described further below) that are supported via outer support structure 238 and inner support structure 240, also discussed further below. Inner support structure 240 and outer support structure 238 are positioned and configured to form an annular opening that may support a plurality of nozzle segments 256 and facilitate airfoil cooling air flow in and out of nozzles 256.

FIG. 3 is an illustration of an exemplary embodiment of a first stage turbine nozzle segment 300 that may be used with combustion turbine engine 100 (shown in FIG. 1). FIG. 3 illustrates a perspective view of turbine nozzle segment 300. As used herein, references to an "axial dimension," "axial direction" or an "axial length" are to be understood to refer to a measurement, distance or length, for example of a nozzle part or component, which extends along or is parallel to axis 301. Further, references herein to a "radial dimension," "radial direction" or a "radial length" are to be understood to refer to a measurement, distance or length, for example of a nozzle part or component, that extends along or is parallel to an axis 302, which intersects axis 301 at a point on axis 301 and is perpendicular thereto. Additionally, references herein to a "circumferential dimension," "circumferential direction", "circumferential length", "chordal dimension," "chordal direction", and "chordal length" are to be understood to refer to a measurement, distance or length, for example of a nozzle part or component, measured in a plane including axis 301 and axis 302 or in a plane parallel with such plane. For example, the length of the arc formed around a turbine shaft by a component such as a turbine nozzle assembly may be referred to as a chordal length.

Referring to FIG. 3, nozzle segment 300 includes two vanes 304, vanes 304 include a leading edge 306 and a trailing edge 308. Segment 300 also includes an arcuate, radially outer endwall 310 having an axial length extending between an outer forward face 312 and an outer aft face 314. Outer aft face 314 includes outer aft face fastener member 315 with fastener open passages 317. Outer forward face 312 includes outer forward face slot 313. An arcuate, radially inner endwall 316 generally opposes outer wall 310 and has an axial length that extends between an inner forward face 318 and an inner aft face 320. Inner forward face 318 includes inner forward face slot 319. A small guide blade 322 and a large guide blade 324 are associated with inner aft face 320. Blade 324 includes a fastener open passage 325. Leading edge 306 of nozzle segment 300 is defined between outer forward face 312 and inner forward face 318 and trailing edge 308 of nozzle segment 300 is defined between outer aft face 314 and inner aft face 320. In the exemplary embodiment, a radial length of trailing edge 308 is greater than a radial length of leading edge 306.

Nozzle segment 300 may include at least one outer seal slot 326 formed in outer endwall 310 and/or at least one inner seal slot 328 formed in inner endwall 316. A suitable seal or gasket (not shown) is insertable into seal slot 326 and/or 328 to form a fluid-proof seal between adjacent nozzle segments 300 and/or adjacent turbine nozzles, when nozzle segment 300 is positioned within the annular opening formed by inner support structure 240 (shown in FIG. 2) and outer support structure 238 (shown in FIG. 2).

Inner endwall 316 includes a plurality of open passages 330 to facilitate nozzle cooling air stream flow into vanes 304. In general, each vane 304 has one open passage in endwall 316 to facilitate nozzle cooling air egress. There are also similar open passages (not shown in FIG. 3) on endwall 310 to facilitate nozzle cooling air ingress.

Exemplary nozzle segment 300 is connectable with adjacent nozzle segments 300 to form a nozzle 256 (shown in FIG. 2) for engine 100 (shown in FIG. 1). Any suitable number of nozzle segments 300 may be circumferentially positioned in the annular region formed by outer support structure 238 and inner support structure 240 and connected to form a turbine nozzle 256 radially about shaft 112 (shown in FIG. 1), and generally extending in an axial direction along axis 301. Segment 300 may be coupled to transition piece 222 (shown in FIG. 2) via slot 313 of outer forward face 312 and slot 319 of inner forward face 318. Segment 300 may be coupled to outer support structure 238 (shown in FIG. 2) via fastener member 315 and at least one fastener (not shown in FIG. 3) through open passages 317. Segment 300 may also be coupled to inner support structure 240 (shown in FIG. 2) via blades 322 and 324 and a fastener (not shown in FIG. 3) through fastener open passage 325.

Figure 4:
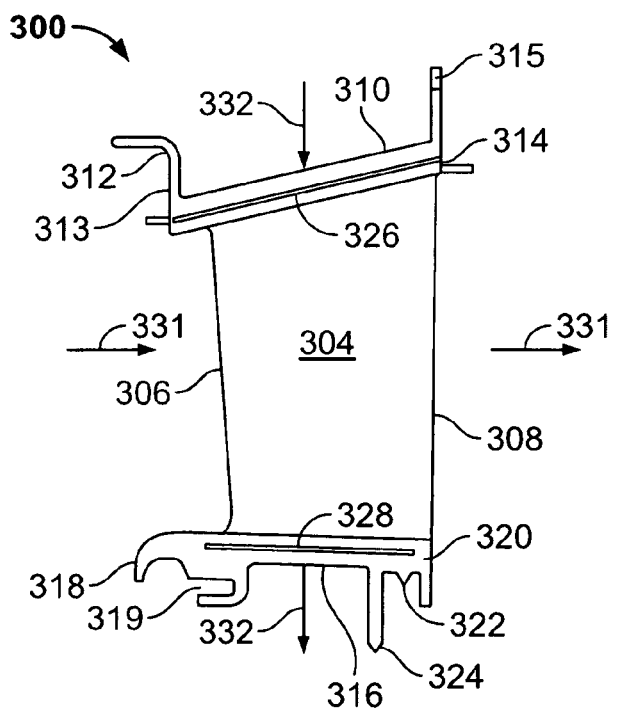
FIG. 4 is an illustration of an alternate perspective of the exemplary embodiment of the first stage turbine nozzle segment that may be used with the combustion turbine engine in FIG. 1.

FIG. 4 is an illustration of an alternate perspective of the exemplary embodiment of the first stage turbine nozzle segment 300 that may be used with engine 100 (shown in FIG. 1). The illustrated perspective is not consistent with the perspective for nozzle segment 256 (shown in FIG. 2) in that FIG. 4 illustrates nozzle segment 300 inverted with a cooling air stream entrance at the top, i.e., FIG. 2 illustrates turbine nozzle segment 256 at the radially upper-most position circumferentially and FIG. 4 illustrates turbine nozzle segment 300 at the radially bottom-most position circumferentially. Segment 300 includes vanes 304, vanes 304 include a leading edge 306 and a trailing edge 308. Segment 300 also includes outer endwall 310, outer forward face 312, outer aft face 314, outer aft face fastener member 315, outer forward face slot 313, inner endwall 316, inner forward face 318, inner aft face 320, inner forward face slot 319, small guide blade 322, large guide blade 324, outer seal slot 326 and inner seal slot 328. In the exemplary embodiment, a radial length of trailing edge 308 is greater than a radial length of leading edge 306.

FIG. 4 also illustrates a combustion gas stream flow 331 and cooling air stream flow 332 with the appropriate arrows.

A chordal length of segment 300 may be predetermined to dimension segment 300 appropriately to facilitate attaining a predetermined nozzle cooling air stream flow rate and a predetermined combustion gas stream flow rate.

Figure 5:
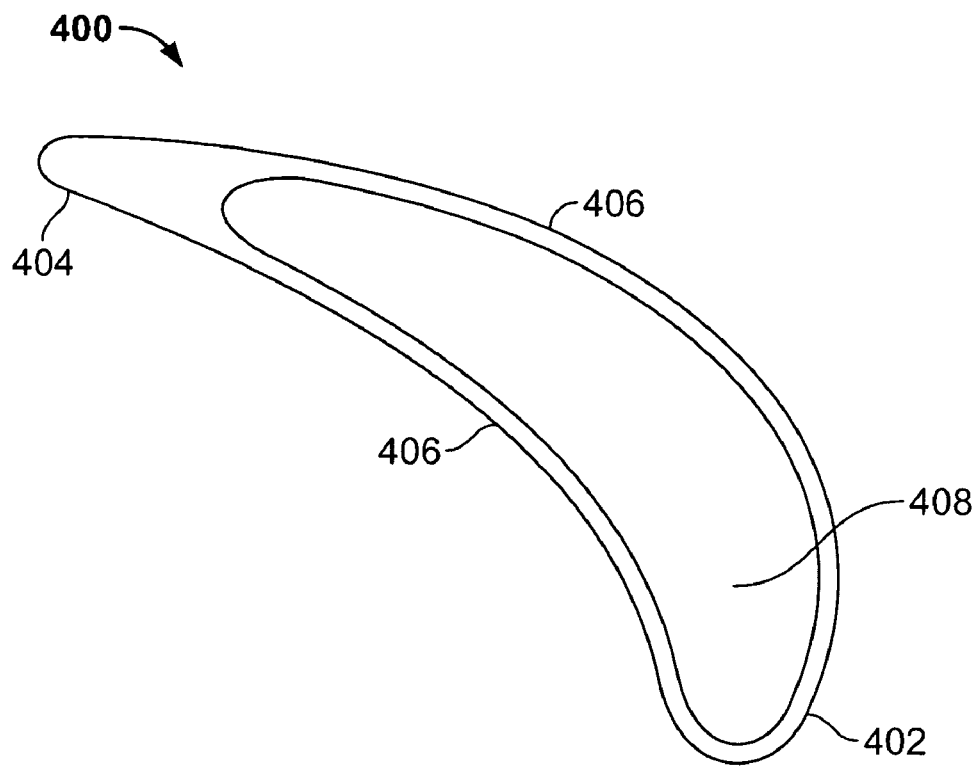
FIG. 5 is an illustration of an exemplary embodiment of a turbine nozzle vane that may be used with the combustion turbine engine in FIG. 1.
Figure 6:
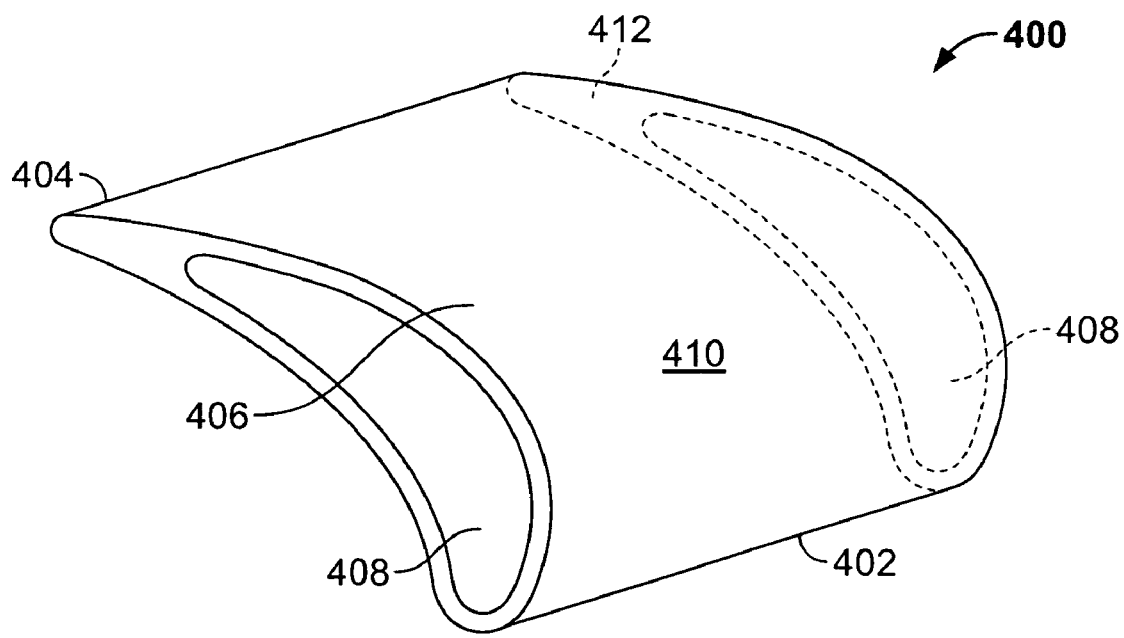
FIG. 6 is an illustration of an alternate perspective of the exemplary embodiment of the turbine nozzle vane that may be used with the combustion turbine engine in FIG. 1.

FIG. 5 is an illustration of an exemplary embodiment of a turbine nozzle vane 400 that may be used with combustion turbine engine 100 (shown in FIG. 1). Vane 400 includes leading edge 402, trailing edge 404, external surface 406, and cooling air open passage 408. FIG. 6 is an illustration of an alternate perspective of the exemplary embodiment of the turbine nozzle vane 400 that may be used with combustion turbine engine 100. In addition to the components illustrated in FIG. 5, FIG. 6 illustrates cooling cavity 410, internal surface 412 and a second open passage 408.

Referring to FIGS. 5 and 6, the combustion gas stream flows over leading edge 402 and is channeled over external surface 406 on both open sides of vane 400. It is noted that the sides of vane 400 that include open passages 408 are coupled to inner endwall 316 (shown in FIG. 3) and outer endwall 310 (shown in FIG. 3), and therefore, are not exposed to gas stream flow. Cooling air is admitted to one of the open passages 408 and enters vane cavity 410. Turbulators (not shown in FIGS. 5 and 6) include small protuberances that may be coupled to interior walls 412. The turbulators induce a turbulence in the cooling air within vane 400 to facilitate heat transfer from external surface 406 to internal surface 412 and, subsequently, to the cooling air. Cooling air exits from the opposite open passage 408. The cooling air at the inlet open passage 408 is normally at a greater pressure and a lesser temperature than the air at the outlet open passage.

Referring to FIG. 3, it is noted that in the exemplary embodiment impingement inserts may not be coupled to nozzle segment 300 to facilitate increasing an associated cooling air flow area and decreasing a resistance to cooling air flow. Alternatively, referring to FIGS. 3 and 6, nozzle 300 may include at least one impingement insert (not shown in FIG. 3) for each associated vane 304, the inserts having a collar at their inlet ends for coupling with integrally cast flanges (not shown in FIG. 3) in outer endwall 310. The inserts may also include extensions that may be inserted into the open passages (not shown in FIG. 3) of endwall 310 and the extensions extend into cavity 410 of vane 400. The extensions include a plurality of impingement flow holes that facilitate an even distribution of cooling air flow within cavity 410.

Figure 7:
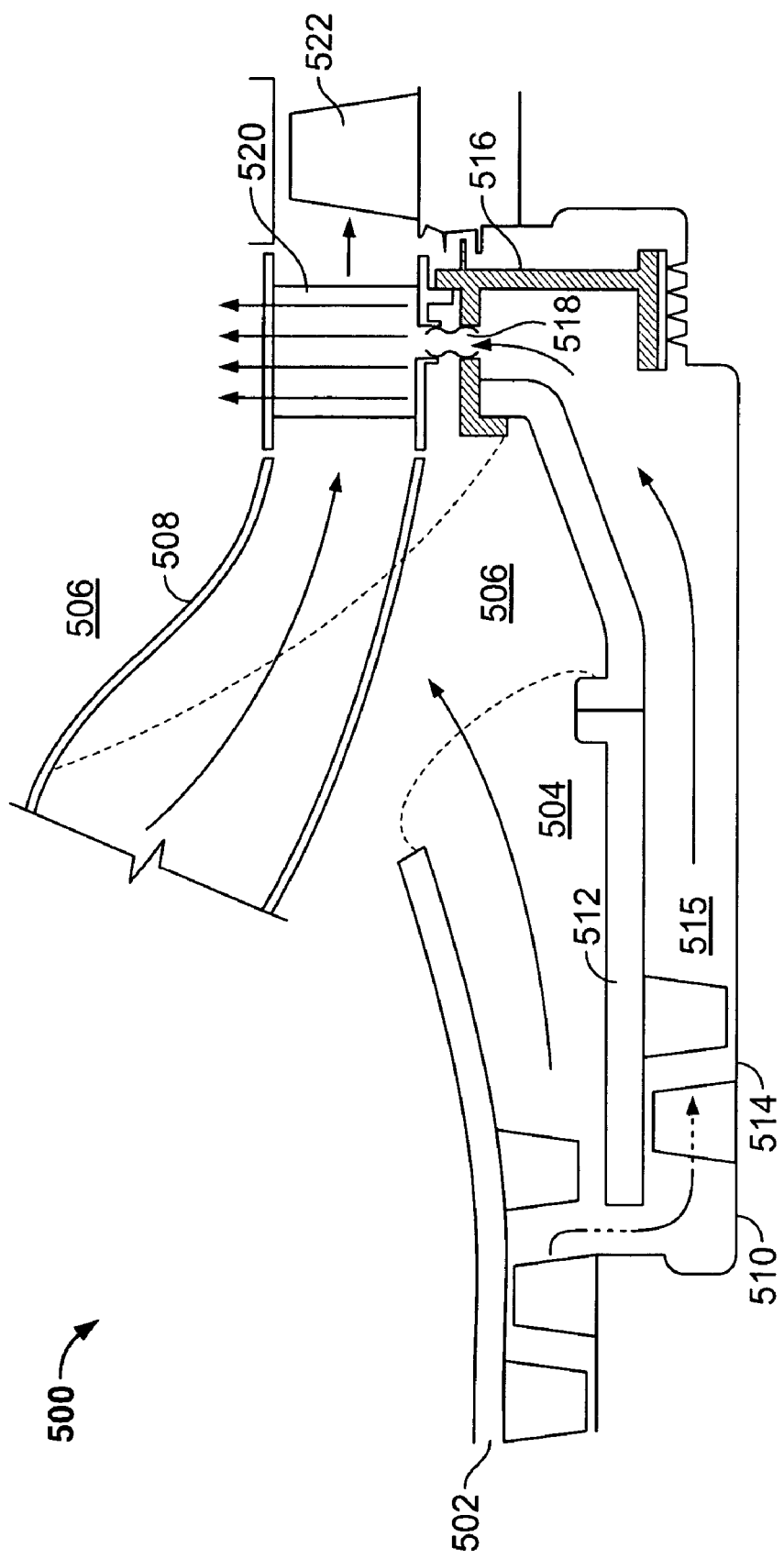
FIG. 7 is a fragmentary illustration of an alternate embodiment of a turbine nozzle cooling sub-system that may be used with the combustion turbine engine in FIG. 1.

FIG. 7 is a fragmentary illustration of an alternate embodiment of a turbine nozzle cooling sub-system 500 that may be used with combustion turbine engine 100 (shown in FIG. 1). System 500 is associated and in flow communication with a compressor assembly 502. Sub-system 500 includes a diffuser 504 and a compressor discharge plenum 506. In addition, sub-system 500 is associated and in flow communication with transition piece 508. Sub-system 500 also includes an airfoil plenum 510 that includes a flow divider 512, a turbine nozzle cooling air compressor 514 and a turbine nozzle cooling air compressor discharge plenum 515. Furthermore, sub-system 500 includes an inner support structure 516, a cooling air stream open passage 518 and turbine nozzle 520. Sub-system 500 is in flow communication with first stage bucket 522.

Compressor assembly 502 is rotatably powered via turbine assembly 110 (shown in FIG. 1). Discharge of compressed air is split into at least two flow streams via flow divider 512. The air stream flow channeled to diffuser 504 is further channeled to compressor discharge plenum 506 as illustrated with the associated arrow and, subsequently, to combustor assembly 104 (shown in FIG. 1).

The air stream flow channeled to airfoil plenum 510, as indicated with the associated arrow, is channeled to turbine nozzle cooling air compressor 514. Compressor 514 includes at least one stage of compression, with the exemplary embodiment illustrating one stage of compression. Compressor 514 may be rotatably powered via compressor 502. Alternatively, compressor 514 may be powered via a rotation sub-system that may be rotatably coupled to turbine assembly 110 or an electric motor. Air discharged from compressor 514 is channeled to turbine nozzle cooling air compressor discharge plenum 515. Inner support assembly 516 facilitates support for turbine nozzle 520. Support assembly 516 includes cooling air stream open passage 518 that facilitates air stream flow from plenum 515 to nozzle 520. Nozzle 520 may be substantially similar to nozzle 300 (shown in FIGS. 3 and 4).

Cooling air flows through nozzle 520 as illustrated with the associated arrows. This cooling air is used for nozzle 520 cooling and is subsequently, fully or partially, discharged from nozzles 520 into plenum 506 for use within combustor assembly 104 (shown in FIG. 1). Some of the cooling air may enter the gas stream as film cooling. A combustion gas stream that is channeled from transition piece 508, through nozzle 520 to fist stage bucket 522 as illustrated by the associated arrows tends to induce a temperature increase is nozzle 520. Heat transfer from nozzle 520 to the nozzle cooling air stream facilitates mitigating a potential to exceed temperature limitations of nozzle 520. It is noted that in this alternative embodiment impingement inserts may not be coupled to nozzle segment 520 to facilitate increasing an associated cooling air flow area and decreasing a resistance to cooling air flow. In another alternative embodiment, nozzle 520 may include at least one impingement insert (not shown in FIG. 7) for each associated vane 304 (shown in FIG. 3), the inserts having a collar at their inlet ends for coupling with integrally cast flanges (not shown in FIG. 3) in outer endwall 310 (shown in FIG. 3). The inserts may also include extensions that may be inserted into the open passages (not shown in FIG. 3) of endwall 310 and the extensions extend into cavity 410 (shown in FIG. 6) of vane 400 (shown in FIG. 6). The extensions include a plurality of impingement flow holes that facilitate an even distribution of cooling air flow within cavity 410.

Figure 8:
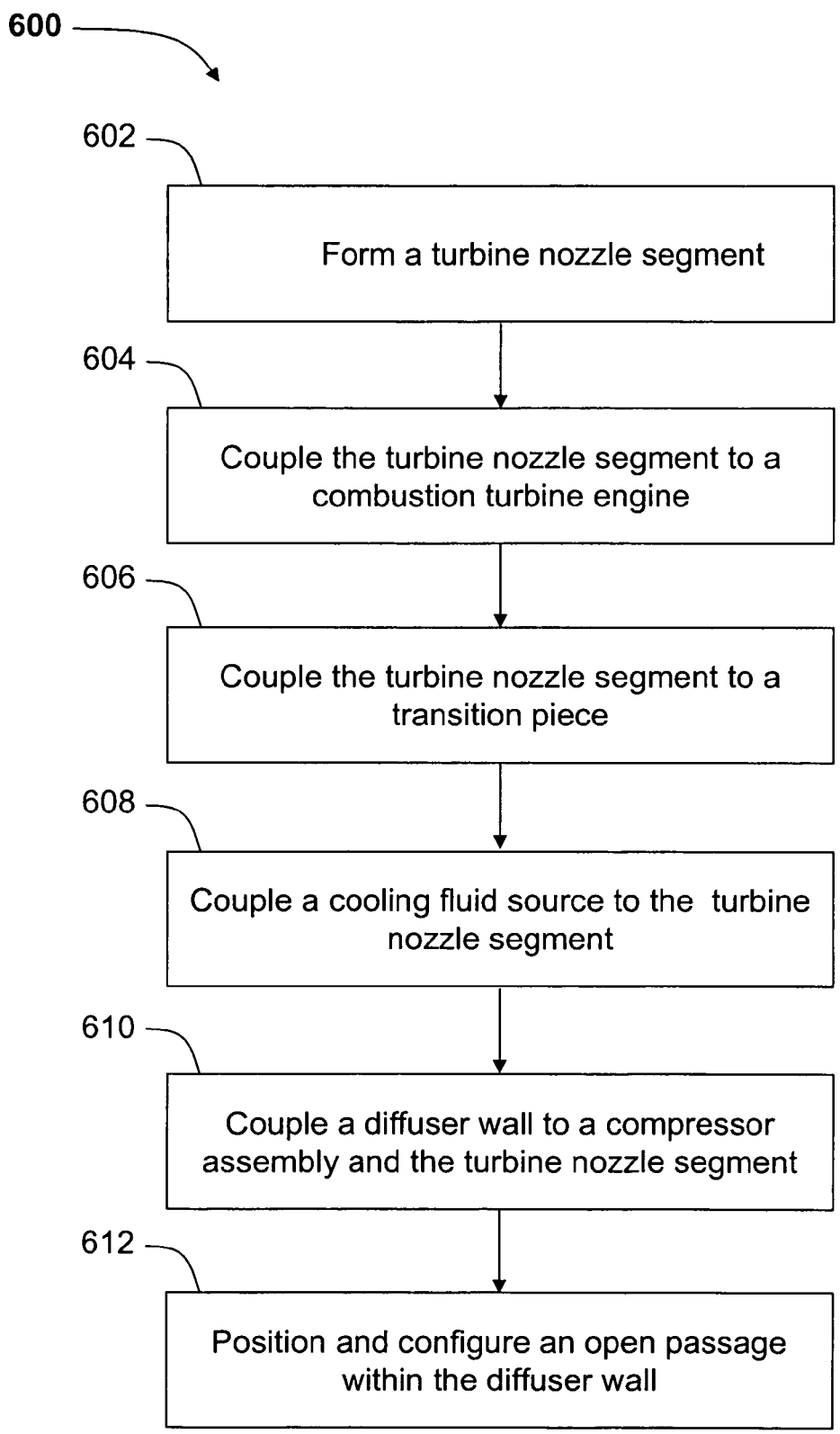
FIG. 8 is a flow chart of an exemplary method for assembling a combustion turbine engine that may be used with the combustion turbine engine in FIG. 1.

FIG. 8 is a flow chart of an exemplary method 600 for assembling combustion turbine engine 100 (shown in FIG. 1). Method step 602 of method 600 includes forming a turbine nozzle segment. Step 602 also includes casting at least one turbine nozzle airfoil vane similar to vane 304 (shown in FIGS. 3 and 4) and vane 400 (shown in FIGS. 5 and 6), wherein external surface 406 of vane 400 being substantially non-porous facilitates a reduction in at least a portion of the airfoil cooling air stream flow entering a hot gas path and subsequently mitigating a combustion gas stream temperature reduction between combustor exit 224 (shown in FIG. 2) and first stage bucket 232 (shown in FIG. 2).

Method step 602 further includes welding an outer radial endwall 310 (shown in FIG. 3) and inner radial endwall 316 (shown in FIG. 3) to vane 304 (shown in FIG. 3).

In the exemplary embodiment, impingement inserts are not inserted into nozzle segments 300. Alternatively, impingement inserts may be inserted into segments 300 to facilitate cooling air flow distribution within segments 300.

Method step 604 of method 600 includes coupling turbine nozzle segment 300 (shown in FIG. 3) to combustion turbine engine 100 (shown in FIG. 1). Referring to FIG. 2, step 604 includes positioning and configuring inner support structure 240 and outer support structure 238 to form an annular opening that may support a plurality of nozzle segments 256 and facilitate air flow in and out of nozzles 256.

Referring to FIG. 3, method step 604 also includes connecting exemplary nozzle segment 300 with adjacent nozzle segments 300 to form nozzle 256 (shown in FIG. 2) for engine 100. Any suitable number of nozzle segments 300 may be circumferentially positioned in the annular region formed by outer support structure 238 (shown in FIG. 2) and inner support structure 240 (shown in FIG. 2) and connected to form a turbine nozzle radially about shaft 112 (shown in FIG. 1).

Step 604 further includes aligning turbine nozzle segment 300 within the annular cavity formed by outer support structure 238 and inner support structure 240 such that the airfoil cooling air stream flow and combustion gas stream flow are facilitated.

Method step 606 of method 600 includes coupling turbine nozzle segment 256 (shown in FIG. 2) to transition piece 222 (shown in FIG. 2), thereby facilitating combustion gas stream flow communication. Segment 300 may be coupled to transition piece 222 via slot 313 of outer forward face 312 and slot 319 of inner forward face 318. Segment 300 may be coupled to outer support structure 238 via fastener member 315 and at least one fastener (not shown in FIG. 3) through open passages 317. Segment 300 may also be coupled to inner support structure 240 via blades 322 and 324 and a fastener (not shown in FIG. 3) through fastener open passage 325.

Referring to FIG. 1, method step 608 of method 600 includes coupling a cooling fluid source to turbine nozzle segment 300 (shown in FIG. 3) such that a cooling fluid may be channeled to the associated turbine nozzle airfoil vanes 304 (shown in FIG. 3), thereby facilitating an airfoil cooling air stream flow. In the exemplary embodiment, step 608 includes coupling turbine assembly 110 to compressor assembly 102 via common shaft 112 to rotatably power compressor assembly 102 such that compressed air may be channeled to turbine nozzle cooling sub-system 108.

Alternatively, referring to FIG. 7, method step 608 may also include installing flow divider 512 and turbine cooling air compressor 514 such that channeling a nozzle cooling air stream is facilitated.

Referring to FIG. 2, method step 610 of method 600 includes coupling diffuser wall 254 to compressor assembly 202 and turbine nozzle segment 256, thereby channeling at least a portion of compressor assembly 202 discharge air stream flow to turbine nozzle segment 256. Diffuser wall 254 may be coupled to assembly 202 and segment 256 via welding. Alternatively, wall 254 may be fastened to assembly 202 and segment 256 with, for example, a mechanism that includes at least one bolt and at least one nut. Also, alternatively, wall 254 may be incorporated into the casting process associated with manufacturing diffuser 250.

Again referring to FIG. 2, method step 612 of method 600 includes positioning and configuring at least one open passage 255 within diffuser wall 254. Step 612 further includes penetrating at least a portion of diffuser wall 254 with at least one open passage 255, thereby directing a substantial portion of the compressor discharge air stream flow to the at least one turbine nozzle segment. One example of penetrating wall 254 is drilling a predetermined number of open passages 255 with a predetermined diameter within wall 254 at a predetermined spacing. Alternatively, open passages 255 may be incorporated into the casting process associated with manufacturing diffuser 250.

Alternatively, method step 612 may not be performed, thereby facilitating channeling substantially 100% of compressor assembly 202 discharge to turbine nozzle cooling sub-system 200.

The methods and apparatus for a turbine nozzle cooling sub-system described herein facilitate operation of a combustion turbine engine. More specifically, designing, installing and operating a turbine nozzle cooling sub-system as described above facilitates operation of a combustion turbine engine by mitigating a decrease in combustion turbine efficiency due to air injection into a combustion gas stream at a turbine first stage nozzle. Furthermore, an increase in $NO_x$ emissions is mitigated with the turbine nozzle cooling sub-system. As a result, degradation of combustion turbine efficiency, the associated increase in fuel costs, extended maintenance costs and engine outages may be reduced or eliminated.

Although the methods and apparatus described and/or illustrated herein are described and/or illustrated with respect to methods and apparatus for a combustion turbine engine, and more specifically, a turbine nozzle cooling sub-system, practice of the methods described and/or illustrated herein is not limited to turbine nozzle cooling sub-systems nor to combustion turbine engines generally. Rather, the methods described and/or illustrated herein are applicable to designing, installing and operating any system.

Exemplary embodiments of turbine nozzle cooling sub-systems as associated with combustion turbine engines are described above in detail. The methods, apparatus and systems are not limited to the specific embodiments described herein nor to the specific turbine nozzle cooling sub-system designed, installed and operated, but rather, the methods of designing, installing and operating f turbine nozzle cooling sub-systems may be utilized independently and separately from other methods, apparatus and systems described herein or to designing, installing and operating components not described herein. For example, other components can also be designed, installed and operated using the methods described herein.

While the invention has been described in terms of various specific embodiments, those skilled in the art will recognize that the invention can be practiced with modification within the spirit and scope of the claims.

What is claimed is:

1. A turbine nozzle cooling sub-system, said sub-system comprising:

at least one turbine nozzle segment comprising an arcuate, radially outermost endwall, an arcuate, radially innermost endwall, and at least one airfoil vane, wherein said outermost endwall comprises at least one open passage, said innermost endwall comprises at least one open passage, said at least one airfoil vane extends between and is coupled to said inner radial endwall and said outer radial endwall, said vane further comprises a cavity, a leading edge, a trailing edge, and an airfoil vane external surface, said cavity comprises an airfoil vane internal surface and a plurality of turbulators, said cavity and said open passages being in flow communication such that an airfoil cooling air stream flow is facilitated; and at least one diffuser in flow communication with a compressor assembly and said at least one turbine nozzle segment, said diffuser comprises at least one diffuser wall and at least one cavity, said at least one diffuser wall extends from the compressor assembly to said turbine nozzle segment such that a channeling of said airfoil cooling air stream to said at least one turbine nozzle segment is facilitated, said airfoil cooling air stream comprises at least a portion of a compressor assembly discharge air stream flow.

2. A turbine nozzle cooling sub-system in accordance with claim 1 wherein said nozzle being in combustion gas stream flow communication with a combustor assembly and a turbine assembly first stage bucket and in cooling air stream flow communication with said diffuser and a compressor discharge plenum, such that said airfoil cooling air stream channeled within said open passage facilitates heat transfer from at least a portion of a combustion gas stream within said turbine nozzle cavity to at least a portion of said air stream via at least a portion of said airfoil vane external surface and at least a portion of said airfoil vane internal surface such that a mitigation of a formation of nitrogen oxides ($NO_x$) is facilitated.

3. A turbine nozzle cooling sub-system in accordance with claim 1 wherein said nozzle is coupled to a turbine assembly via said outer endwall to an outer support structure and said inner endwall to an inner support structure, said outer support structure and said inner support structure positioned and configured such that said airfoil cooling air stream flow is facilitated.

4. A turbine nozzle cooling sub-system in accordance with claim 1 wherein said plurality of turbulators comprises a plurality of protuberances coupled to at least a portion of said inner airfoil vane surface of said at least one turbine nozzle segment, said plurality of baffles positioned in flow communication with at least a portion of said airfoil cooling air stream flow such that a turbulence is induced within at least a portion of said air stream, said turbulence facilitates heat transfer from at least a portion of a combustion gas stream within said turbine nozzle segment to at least a portion of said air stream via at least a portion of said turbine nozzle airfoil vane external surface and at least a portion of said turbine nozzle airfoil vane internal surface.

5. A turbine nozzle cooling sub-system in accordance with claim 1 wherein said cavity is positioned and configured to facilitate at least a portion of an airfoil cooling air stream flow across at least a portion of said turbine nozzle airfoil vane internal surface.

6. A turbine nozzle cooling sub-system in accordance with claim 1 wherein said at least one diffuser wall comprises at least one open passage, said at least one open passage being in direct flow communication with a compressor discharge plenum such that at least a portion of the compressor discharge air stream flow within said diffuser is channeled directly to the compressor discharge plenum.

7. A turbine nozzle cooling sub-system in accordance with claim 1 wherein said airfoil plenum comprises a flow divider and a turbine nozzle cooling air compressor, said flow divider and turbine nozzle cooling air compressor in flow communication with the compressor assembly, wherein said flow divider facilitates channeling at least a portion of a compressor assembly discharge air stream flow to said turbine nozzle cooling air compressor, said compressor comprises at least one stage of compression and is in flow communication with said turbine nozzle segment, said turbine nozzle segment being in flow communication with a compressor discharge plenum such that channeling at least a portion of nozzle cooling air to said compressor discharge plenum is facilitated, said compressor discharge plenum being in flow communication with a combustor assembly such that channeling at least a portion of the nozzle cooling air to said combustor assembly is facilitated.

8. A turbine nozzle cooling sub-system in accordance with claim 1 wherein said at least one diffuser wall comprises a substantially non-porous material positioned and configured such that a substantial majority of the compressor assembly discharge air stream flow within said diffuser is channeled directly to said turbine nozzle segment.

9. A turbine nozzle cooling sub-system in accordance with claim 1 wherein said airfoil vane cavity comprises at least one impingement sleeve inserted within said cavity, wherein said at least one impingement sleeve positioned in flow communication with at least a portion of said airfoil cooling air stream facilitates heat transfer from at least a portion of a combustion gas stream to said airfoil cooling air stream, said airfoil cooling air stream within said airfoil vane cavity, via at least a portion of said airfoil vane external surface and at least a portion of said airfoil vane internal surface.

10. A method of assembling a combustion turbine engine, said method comprising:
coupling at least one turbine nozzle segment to at least a portion of a combustion turbine engine stationary support structure;
coupling the at least one turbine nozzle segment to at least one transition piece;
coupling a cooling fluid source to the at least one turbine nozzle segment such that a cooling fluid may be channeled to at least one turbine nozzle airfoil vane; and
coupling a diffuser wall to a compressor assembly and the at least one turbine nozzle segment, so that at least a portion of a compressor assembly discharge air stream flows to the at least one turbine nozzle segment.

11. A method in accordance with claim 10 wherein coupling the at least one turbine nozzle segment to the at least a portion of a combustion turbine engine stationary support structure comprises assembling at least one turbine nozzle airfoil vane, assembling one vane comprises casting at least one turbine nozzle airfoil vane, the airfoil vane comprising a cavity, a plurality of open passages and an airfoil vane external surface, said cavity comprising an airfoil vane internal surface and a plurality of turbulators, said cavity and said open passages being in flow communication, at least a portion of the vane external surface being substantially non-porous, thereby facilitating a reduction in at least a portion of the airfoil cooling air stream flow entering a hot gas path and subsequently mitigating a temperature reduction between a combustor assembly discharge and a turbine assembly inlet, thereby facilitating a mitigation of a formation of nitrogen oxides ($NO_x$).

12. A method in accordance with claim 11 wherein assembling at least one turbine nozzle airfoil vane further comprises welding an outer radial endwall and an inner radial endwall to the vane, the outer endwall and inner endwall each comprising at least one open passage, the endwall open passages being in flow communication with the vane open passages, thereby facilitating the airfoil cooling air stream flow.

13. A method in accordance with claim 10 wherein coupling the at least one turbine nozzle segment to the at least a portion of a combustion turbine engine stationary support structure further comprises positioning and configuring an outer support structure and an inner support structure, thereby forming an annular cavity between the outer support structure and the inner support structure, the annular cavity facilitating the airfoil cooling air stream flow.

14. A method in accordance with claim 10 wherein coupling the at least one turbine nozzle segment to the at least a portion of a combustion turbine engine stationary support structure further comprises coupling the airfoil vane outer endwall to the outer support structure and the airfoil vane inner endwall to the inner support structure, subsequently aligning the at least one turbine nozzle segment within the annular cavity formed by the outer support structure and the inner support structure such that the airfoil cooling air stream flow is facilitated.

15. A method in accordance with claim 10 wherein coupling a diffuser wall to a compressor assembly and the at least one turbine nozzle segment comprises positioning and configuring at least one open passage within the diffuser wall, wherein positioning and configuring comprises penetrating at least a portion of the diffuser wall with at least one open passage, thereby directing a substantial portion of the compressor discharge air stream flow to the at least one turbine nozzle segment.

16. A combustion turbine engine, said engine comprises:
a compressor assembly;
a combustor assembly in flow communication with said compressor assembly;
a turbine nozzle cooling sub-system, said sub-system comprises at least one turbine nozzle segment, said nozzle comprises an arcuate, radially outermost endwall, an arcuate, radially innermost endwall, and at least one airfoil vane, wherein said outermost endwall comprises at least one open passage, said innermost endwall comprises at least one open passage, said at least one airfoil vane extends between and is coupled to said inner radial wall and said outer radial wall, said vane further comprises a cavity, a leading edge, a trailing edge, and an airfoil vane external surface, said cavity comprises an airfoil vane internal surface and a plurality of turbulators, said cavity and said open passages being in flow communication such that an airfoil cooling air stream flow is facilitated, and at least one diffuser in flow communication with a compressor assembly and said at least one turbine nozzle segment, said diffuser comprising at least one diffuser wall and at least one cavity, said at least one diffuser wall extends from the compressor assembly to said turbine nozzle segment such that a channeling of said airfoil cooling air stream to said at least one turbine nozzle segment is facilitated, said airfoil cooling air stream comprises at least a portion of a compressor assembly discharge air stream flow; and
a turbine assembly in flow communication with said turbine nozzle cooling sub-system.

17. A combustion turbine engine in accordance with claim 16 wherein said nozzle is in combustion gas stream flow communication with said combustor assembly and a turbine assembly first stage bucket and in cooling air stream flow communication with said diffuser and a compressor discharge plenum, such that said airfoil cooling air stream channeled within said open passage facilitates heat transfer from at least a portion of a combustion gas stream within said turbine nozzle cavity to at least a portion of said air stream via at least a portion of said airfoil vane external surface and at least a portion of said airfoil vane internal surface such that a mitigation of a formation of nitrogen oxides ($NO_x$) is facilitated.

18. A combustion turbine engine in accordance with claim 16 wherein said nozzle is coupled to said turbine assembly via said outer endwall to an outer support structure and said inner endwall to an inner support structure, said outer support structure and said inner support structure positioned and configured such that said airfoil cooling air stream flow is facilitated.

19. A combustion turbine engine in accordance with claim 16 wherein said plurality of turbulators comprises a plurality of protuberances coupled to at least a portion of said inner airfoil vane surface of said at least one turbine nozzle segment, said plurality of baffles positioned in flow communication with at least a portion of said airfoil cooling air stream flow such that a turbulence is induced within at least a portion of said air stream, said turbulence facilitates heat transfer from at least a portion of a combustion gas stream within said turbine nozzle segment to at least a portion of said air stream via at least a portion of said turbine nozzle airfoil vane external surface and at least a portion of said turbine nozzle airfoil vane internal surface.

20. A combustion turbine engine in accordance with claim 16 wherein said at least one diffuser wall comprises at least one open passage, said at least one open passage being in direct flow communication with a compressor discharge plenum such that at least a portion of the compressor discharge air stream flow within said diffuser is channeled directly to the compressor discharge plenum.

\* \* \* \* \*